(12) United States Patent
Kröger et al.

(10) Patent No.: US 7,546,362 B2
(45) Date of Patent: Jun. 9, 2009

(54) AUTOMATIC PLANNING OF NETWORK CONFIGURATIONS

(75) Inventors: Reinhold Kröger, Vettelschoss (DE); Holger Machens, Wiesbaden (DE)

(73) Assignee: Siemens Aktiengesellschaft, Munich (DE)

( * ) Notice: Subject to any disclaimer, the term of this patent is extended or adjusted under 35 U.S.C. 154(b) by 728 days.

(21) Appl. No.: 11/194,930

(22) Filed: Aug. 2, 2005

(65) Prior Publication Data

US 2006/0026276 A1 Feb. 2, 2006

(30) Foreign Application Priority Data

Aug. 2, 2004 (EP) .................................. 04018287

(51) Int. Cl.
*G06F 15/173* (2006.01)
(52) U.S. Cl. .......................... 709/223; 709/252; 707/5; 370/254; 703/13
(58) Field of Classification Search ................. 709/223, 709/252; 707/5; 370/254; 703/13
See application file for complete search history.

(56) References Cited

U.S. PATENT DOCUMENTS

| | | | | |
|---|---|---|---|---|
| 6,958,979 | B2 * | 10/2005 | Bulick et al. ................. | 370/254 |
| 7,117,273 | B1 * | 10/2006 | O'Toole et al. ............. | 709/252 |
| 2003/0181210 | A1 | 9/2003 | Shipman | |
| 2004/0117166 | A1 * | 6/2004 | Cassiolato .................... | 703/13 |
| 2005/0010571 | A1 * | 1/2005 | Solotorevsky et al. .......... | 707/5 |

OTHER PUBLICATIONS

Nobumasa Ishiwa and Hiroyuki Okazaki, "An Expert System for Planning Private Networks", NEC Research and Development, Nippon Electric Ltd, Tokyo, JP, vol. 35, No. 3, Jul. 1, 1994, pp. 306-314, XP000468662.

Kemal Altinkemer, "Parallel Savings Heuristics for Designing Multi Center Tree Networks", System Sciences, 1989, vol. III: Decision Support and Knowledge Based System Trac, Proceedings of the Twenty-Second Annual Hawaii International Conference on Kailua-Kona, HI, USA, Jan. 3-6, 1989, Washington, DC, USA, IEEE Comput. Soc. PR, US, Jan. 3, 1989, pp. 762-769, XP0100015020.

* cited by examiner

*Primary Examiner*—Tonia L Dollinger
*Assistant Examiner*—Kyung H Shin

(57) ABSTRACT

The invention relates to a device and a method, which reduce the outlay required when searching for a suitable network configuration, in particular in the field of automation. The device for the automatic planning of a network configuration, in particular for an automation system, comprises at least one partition module to break down at least one described network planning problem into sub-problems, at least one production module to generate at least one solution to each of the sub-problems of the at least one network planning problem based on predefinable rules and at least one validation module to verify the generated solutions to the sub-problems. The purpose of the device and the method according to the invention for automatic network planning is to support the planning process for network structures for major systems, in particular for systems with more than 1000 users, by supplying suitable methods and tools. One of the focal areas is switch-based Ethernet-LANs, as used for example in PROFInet environments.

14 Claims, 3 Drawing Sheets

Ebenen

A          B

I   II   III a b

7,546,362 B2

AUTOMATIC PLANNING OF NETWORK CONFIGURATIONS

CROSS REFERENCE TO RELATED APPLICATIONS

This application claims priority to the European application No. 04018287.5, filed Aug. 2, 2004 and which is incorporated by reference herein in its entirety.

FIELD OF INVENTION

The invention relates to the automatic planning of network configurations.

SUMMARY OF THE INVENTION

The engineering of automation units in particular is a complex and time-intensive task. Complex automation units are distributed and are frequently based on multilevel network architectures such as field buses (e.g. PROFIbus) and higher-order Ethernet-based factory networks. In this process the boundaries between traditional field buses and higher networks become increasingly blurred (e.g. PROFInet). While the engineering of PROFIbus structures is wholly controlled, the concept of Ethernet networks is still problematic for a large number of users, in particular when quality of service criteria such as end-to-end delay times and usage limits have to be complied with.

In principle the search for a network architecture represents an NP class problem. For large numbers of users therefore brute force approaches, which are means for resolving difficult problems in the areas of IT and game theory and involve trying out all variants, soon become impractical.

There is therefore a particular interest in all tools, which support and simplify this process in respect of freedom from error and effectiveness. However until now such tools have tended to be considered in isolation and often require the repeated inputting of already available information in a more or less identical form.

The object of the present invention is therefore to specify a device and a method, which reduce the outlay required when searching for a suitable network configuration, particularly in the field of automation.

The object is achieved by a device for the automatic planning of a network configuration, in particular for an automation system, with at least one partition module to break down at least one described network planning problem into sub-problems, at least one production module to generate at least one solution to each of the sub-problems of the at least one network planning problem based on pre-definable rules and at least one validation module to verify the generated solutions to the sub-problems.

The object is also achieved by a method for the automatic planning of a network configuration, in particular for an automation system, in which at least one described network planning problem is broken down into sub-problems using partition methods, at least one solution is generated for each of the sub-problems of the at least one network planning problem based on predefinable, extendable rules by means of a heuristic search and the generated solutions to the sub-problems are verified by means of an acceptance test.

The purpose of the device and the method according to the invention for automatic network planning is to support the network structure planning process for major systems, in particular for system with more than 1000 users, by providing suitable methods and tools. One of the focal areas is switch-based Ethernet-LANs, as used for example in PROFInet environments.

In the device and method according to the invention, methods derived from artificial intelligence are therefore used to control the search for an acceptable solution.

The device and method described are used to generate a configuration in limited computing time, which connects all the devices to form a functional network, takes account of existing construction rules, complies with any quality of service criteria and usage limits set and is as economical as possible to set up.

The invention is described in more detail below with reference to the exemplary embodiments shown in the figures.

DETAILED DESCRIPTION OF THE INVENTION

Figure 1:
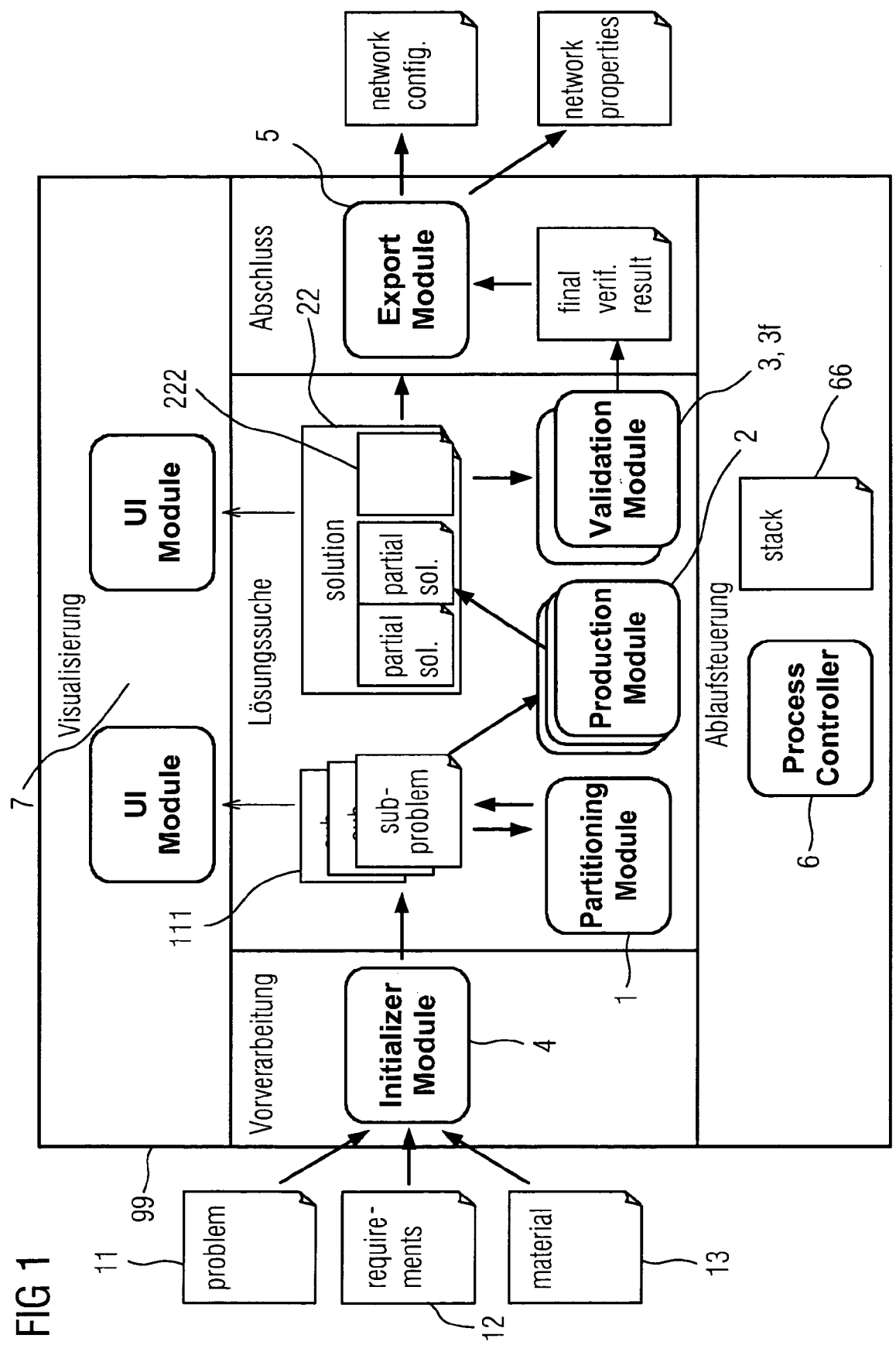
FIG. 1 shows a schematic diagram of the device for the automatic planning of network configurations.

FIG. 1 shows a schematic diagram of the device for the automatic planning of network configurations. The algorithm for generating the network is embedded in a framework 99, which provides a series of services, data structures and interfaces as elements of a network design infrastructure.

The framework 99 contains one or a plurality of partition modules 1, each of which breaks a network planning problem 11 down into sub-problems 111. A description model for a network planning problem 11 also exists as does an initialization model 4 for reading in the input data for a network planning problem 11. One or a plurality of production modules 2 then generate(s) partial solutions 222 to the network planning problems 11 according to defined rules. One or a plurality of validation modules 3, 3f verify/ies the generated partial solutions 222 and complete a final acceptance test for the overall solution 22.

The device also has a process controller 6 for the solution process, an export module 5 to output the solutions 22, 222 and the validation results from the validation modules 3, 3f and a graphic user interface 7 to display the solution process and the solution visually.

The network configuration generation process is controlled by the process controller 6, which monitors the individual steps of the process and delegates completion of the respective sub-tasks in the various phases (preparation phase, search for a solution, completion phase) to the competent modules 1, 2, 3, 4, 5. The process controller 6 thereby follows an algorithm, the architectural features of which can be described as follows:

Initialization module 4 reads in a network planning problem 11 converted to graph theory One or a plurality of partition modules 1 break down problem by means of partition methods Representation of expert knowledge by extendable sets of production rules, as well as heuristic search in a search tree with evaluation of partial solutions 222 by the production modules 2

Backtracking based on stack processing 66 of incremental partial solutions 222, controlled by the process controller 6

Acceptance test by simulating the network loads induced by component communication in the validation modules 3, 3f

Export module outputs the generated network structure and the validation results obtained The planning process is based on the geometrical data of the automation devices to be networked within the unit and a material list with the active network components that can be used (such as switches and repeaters), cables, etc. A model, comprising the following elements, exists to describe the problem 11 to be resolved:

Nodes: Identity, position and area association of the communication end points of automation devices Communication relationships: description of the communication taking place between the communication end points from the logical connection and link from software components to automation devices The area information relates to areas provided by the developer of the automation unit. These include for example:

Safety areas: emergency stop deactivates all the components involved in this area Operating mode areas: in this area it is possible to switch between different operating modes (e.g. automatic and manual operation)

HMI areas: all the automation devices of an area can be controlled at a human/machine interface Start-up areas: the components in an area are started up together if required Such areas are represented in the graph-based problem description as attributes of the nodes. Handling area-specific requirements is the task of the production modules 2, which are deployed in the search phase.

The requirements 12 of the network administrator and a material list 12 are input into the system as well as the problem description. The requirements 12 include the various quality of service or QoS requirements (end-to-end delay times permitted here) and a prioritization taking into account costs incurred. The material list 13 contains the available types of network component such as switches, hubs, repeaters and cables and similar materials.

The network planning problem 11 in the description model, the requirements 12 and the material list 13 are first read into the internal data structures by the initialization module 4 in the preparation phase, before the problem is routed to the solution process.

The present network planning problem 11 belongs to the class of total NP problems. The algorithms known from the literature all have the characteristic that transit time increases exponentially with the number of nodes and connections. One of the most important conditions for finding a solution to the problem in a reasonable time therefore involves reducing the complexity. Breaking down the problem 11 into a number of sub-problems 111 automatically reduces the complexity, thus improving the transit time.

Such division breaks the overall number of nodes into subsets, combining nodes in autonomous groups, each representing a sub-problem. Once the sub-problem has been resolved, the group is replaced by one or a plurality of new nodes, which then represent all the communication end points in the group.

As breaking down the problem impacts on the solution, the various requirements are taken into account here. Breaking down and grouping can essentially be based on a plurality of different criteria:

Coupling element ports: e.g. number of nodes that can be combined with a switch limited by number of ports.

Intensity of communication relationship or strictness of QoS requirements: the more switches there are between two nodes, the longer the end-to-end delay Distance of nodes from each other: the further the nodes are from a switch, the longer the cables have to be for example, therefore the higher the costs Area-specific conditions: a switch within a safety area (see above) is not permitted to convey messages, which are not directly linked to communication between the components in the area As the partition method can vary depending on the criteria selected, a number of partition modules 1 are provided, which can be extended and replaced. As well as the initial problem breakdown, the dynamic breakdown of a sub-problem 111 into further sub-problems is also supported, if a production module 2 has been unable to produce a solution to the sub-problem 111. Generally the problem breakdown process results in a tree of sub-problems, each comprising a number of nodes of the originally defined problem or representatives of underlying sub-problems.

Figure 2:
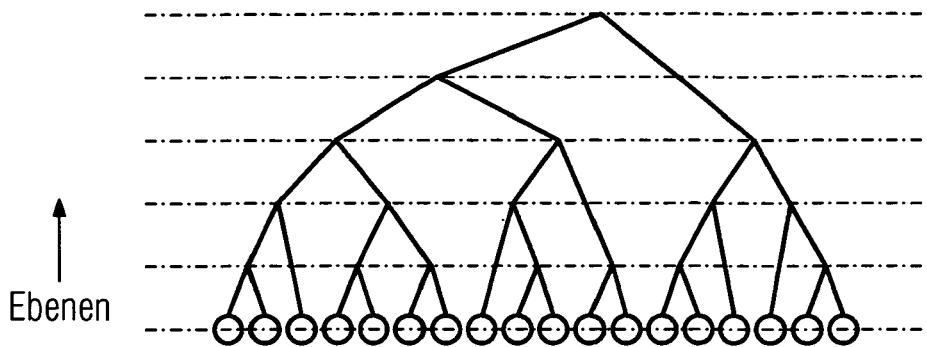
FIG. 2 shows a schematic diagram of the breakdown into sub-problems.

The result of a breakdown into groups of two is shown as an example in FIG. 2. The tree of sub-problems 111 resulting from the breakdown is partly sequentialized by the process controller, so that starting at the lowest level of the tree the sub-problems 111 are gradually routed to the production modules 2 to generate a partial solution 111. As the sub-problems are mutually independent to a certain degree, the search for a solution to the sub-problems 111 can be carried out in parallel. Existing dependencies between the sub-problems 111 are defined by priority relationships, which the process controller 6 on the one hand uses for sequentialization and on the other hand uses to force synchronization during parallel processing, until all the necessary input for a sub-problem are present.

For defined problem patterns the production modules 2 are used to integrate fixed production rules, i.e. suitable solution patterns, into the system, also including examples of algorithms for sub-problems 111 described in the literature. The number of production rules suitable for a defined (sub) problem 11, 111 is selected with reference to a pattern comparison. To this end the production rule is provided with a pattern, which selects those problems, to which the production rule can be applied. The pattern can thereby contain both information about the number and position of the nodes involved and the ID or type of the areas in question.

Figure 3:
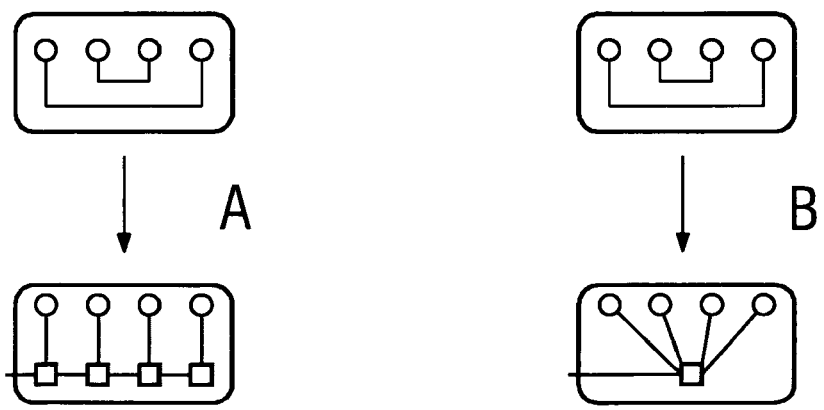
FIG. 3 shows a schematic diagram of the mode of operation of production rules.

FIG. 3 shows the mode of operation of two production rules A, B. If a plurality of production rules A, B can be applied to a problem pattern, rule selection can be controlled by a previously defined prioritization.

The set of production modules can be modified, allowing the system to be tailored to a wide range of user requirements. If for example a line topology is preferred for the Ethernet network, as in the case of most PROFInet environments, a corresponding set of production rules can be compiled. The sets of production rules can also be divided into individual phases, in which specific tasks respectively have to be completed, e.g. locating switches, hubs etc. in a first phase and laying cables in a second phase. A set of associated rules represents the domain-specific expert knowledge.

Figure 4:
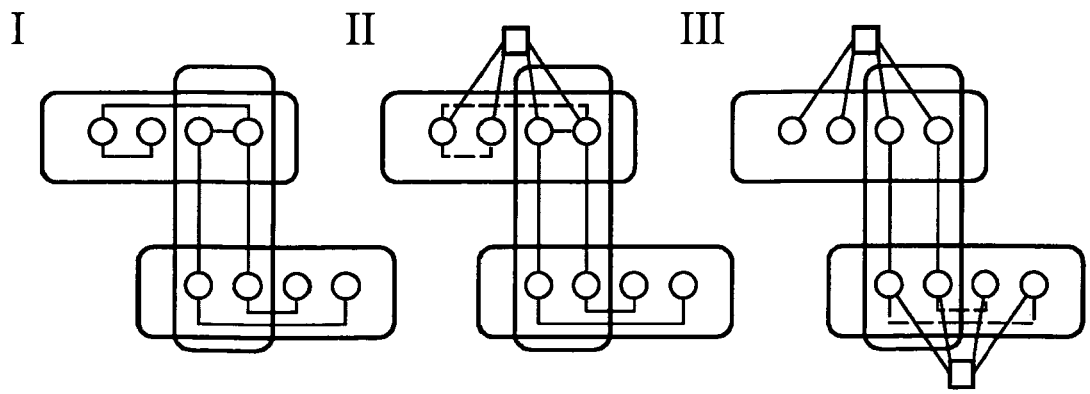
FIG. 4 shows a schematic diagram of the steps during the search for a solution.

During the search for a solution, for which three exemplary steps I, II, III are shown in FIG. 4, the sub-problems 111 identified during the breakdown are routed to the production modules for application of the production rules. This generates a partial solution 222, i.e. part of the required network configuration. The generated partial network can then be seen as a closed group, as already described in the section on the partition modules.

Figure 5:
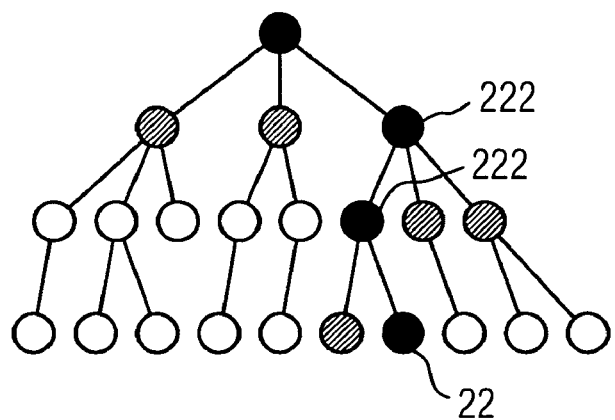
FIG. 5 shows an example of a heuristic search in the search tree.

As a plurality of production rules can be applied to a problem 11 and one production rule can potentially also generate a plurality of different solutions, the process of the search for a solution is structured in a search tree, as shown in FIG. 5. In the search tree every node represents the conversion of a sub-problem 111 to a partial solution 222. At the bottom end of each path through the search tree is an overall or total solution 22, which does not however always represent an ideal solution.

The correct path through the search tree is determined by the application of heuristics, i.e. estimates of the gain to be expected from a specific solution in the respective step in the search tree. FIG. 5 shows a graphic representation of such a heuristic search. Starting from the first node on the top level the algorithm first uses evaluation functions to try to estimate the gain from the three subsequent partial solutions 222 (or even sequential states) respectively and then decides on the path on the right side. There are three possible solutions 222 again in the next node. This time the algorithm takes the left path, etc.

Variables that can be used to evaluate a solution 22, 222 are for example the resulting costs, the expected network usage or progress achieved, measured as the number of nodes networked by the solution. The evaluation is carried out at two levels:

In the production module 2 itself by evaluating the solutions 22, 222 that are possible according to its production rules By the process controller 6 via all production modules 2 by analyzing the evaluation that can be achieved by the production modules 2

Once the partial solutions 222 have been generated, a rough output evaluation is carried out with the aid of a validation module 3. An analytical tool is typically used for this, which can provide a rough estimate at high speed.

If during verification of a partial solution 222, it is identified that a requirement relating to QoS or network cost has not been complied with, so-called backtracking takes place. The last state in the search tree is restored in each instance by the process controller 6 and one of the remaining sequential states is selected instead of the last selected state.

Figure 6:
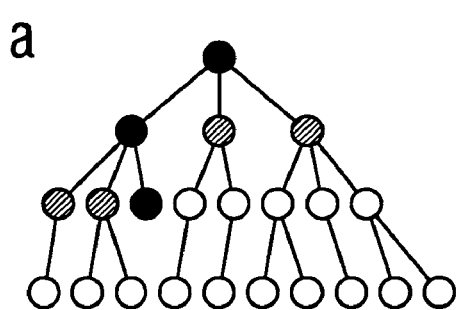
FIG. 6 shows a schematic diagram of the backtracking method.
Figure 6:
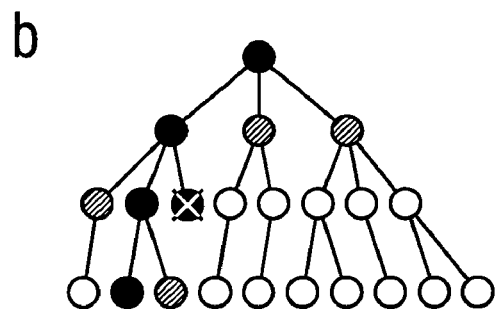

FIG. 6 shows a graphic representation of this process. In step a the algorithm reaches a state, which does not comply with one or a plurality of requirements and therefore in other words does not permit any sequential states. In step b the algorithm has therefore backtracked and selected another sequential state of the state previously visited and has therefore been successfully completed.

For backtracking, i.e. the restoration of an already processed state in the search tree, a stack 66 is used, in which all the states on the path to the current state are stored. Storing the entire state space would quickly use up the capacity of the available storage unit. As the state space can also be very deep, the process controller 6 uses a special stack 66 for large stack depths.

The state information, to be stored on the stack 66, includes on the one hand all the information required to undo a change made in the network and on the other hand the information required to select a new sequential state. It also includes the sequence of already selected production rules A, B, the production module 2 that generated the last state and specific information which the production module 2 can use to identify the next sequential state to be generated in each instance.

A plurality of validation modules 3 can be used to verify the sub-problems 111, each verifying various sub-aspects of the requirements. At the end of the search an acceptance test is carried out on the network configuration obtained using a simulator. Final verification of the overall solution is also carried out by a validation module 3. The validation modules 3f provided for this purpose are characterized by a corresponding "final" attribute for selection, as they achieve a much higher level of accuracy than the rough output evaluations carried out during the search and therefore require more computing capacity.

This step should generally only supply more precise output values for the generated network but because of its higher level of accuracy it can also reveal failure to comply with requirements. Backtracking is first carried out here too, in the hope of an improvement. If however no suitable solution is found, the critical sections in the network are marked and the user is given the option of subsequent improvement.

Said subsequent improvement by the user can either take place manually or by feeding the problem back into the system. To this end critical sections can be selected for processing, partial solutions can be predefined, which the system takes directly over into the solution, or the unmodified original problem description 11 can be input into the system using new parameters, i.e. redefined requirements.

The invention claimed is:

1. A device for the automatic planning of a network configuration for an automation system, comprising:
   a memory coupled to a processor;
   at least one partition module to break down at least one described network planning problem into sub-problems;
   at least one production module for generating at least one solution to each of the sub-problems of the at least one network planning problem based on pre-definable rules; and
   at least one validation module for verifying the generated solutions to the sub-problems, wherein the break down of said at least one described network planning problem into sub-problems is based on a plurality of criteria comprising: 1) a criterion regarding node combinability as a function of a number of nodes that can be interconnected by a respective circuitry of the network; 2) a criterion regarding intensity of communication interaction between nodes; 3) a criterion regarding node distance separation from one another and from the respective circuitry of the network; an 4) a criterion regarding functional limitations imposed on a respective circuitry for carrying a communication in a respective location; and
   a stack for storing already generated partial solutions to a network planning problem, wherein the generated partial solutions comprises successive states, wherein the stack is configured to perform a backtrack operation to restore a previous state in the event a present state does not meet at least one of the criteria so that another of the successive states can be selected.

2. The device according to claim 1, further comprising:
   at least one initialization module for reading in the at least one network planning problem in the form of input data.

3. The device according to claim 2, wherein the at least one network planning problem can be read in the form of a model.

4. The device according to claim 1, further comprising:
   at least one further validation module for performing a final acceptance test on overall solutions using a simulator.

5. The device according to claim 1, further comprising:
an export module to output generated overall solutions and/or to output the results of the verifications by the validation modules.

6. The device according to claim 1, further comprising:
a process controller for monitoring individual steps of the planning process and/or for delegating sub-tasks to respectively competent modules.

7. The device according to claim 1, further comprising:
at least one graphic user interface for displaying a solution process and/or solutions visually.

8. A method for automatically planning a network configuration for an automation system, comprising:
a memory coupled to a processor;
subdividing at least one described network planning problem into sub-problems by means of partition methods;
generating at least one solution for each of the sub-problems of the at least one network planning problem based on pre-definable, extendable rules, by means of a heuristic search; and
verifying the generated solutions to the sub-problems by means of an acceptance test wherein the subdividing of said at least one described network planning problem into sub-problems is based on a plurality of criteria comprising: 1) a criterion regarding node combinability as a function of a number of nodes that can be interconnected by a respective circuitry of the network; 2) a criterion regarding intensity, of communication interaction between nodes; 3) a criterion regarding node distance separation from one another and from the respective circuitry of the network; and 4) a criterion regarding functional limitations imposed on a respective circuitry for carrying a communication in a respective location;
storing generated partial solutions to a network planning problem in a stack, wherein the generated partial solutions comprises successive states; and
in the event a present state does not meet at least one of the criteria, backtracking to restore a previous state so that another of the successive states can be selected from the solutions stored in the stack.

9. The method according to claim 8, wherein at least one network planning problem converted to graph theory is read in by input data.

10. The method according to claim 9, wherein the at least one network planning problem is read in in the form of a model.

11. The method according to claim 8, wherein at least one final acceptance test is carried out on the overall solutions by means of simulation.

12. The method according to claim 8, wherein generated overall solutions and/or the results of the verifications carried out by means of acceptance tests is/are output via an export module.

13. The method according to claim 8, wherein individual steps of the planning process are monitored by a process controller and/or sub-tasks are delegated to the respectively competent modules by the process controller.

14. The method according to claim 8, wherein a solution process and/or the solutions are displayed visually via at least one graphic user interface.

* * * * *